Dec. 15, 1925.  
J. MILLS  
THERMIONIC METER  
Filed Sept. 8, 1920
1,566,034
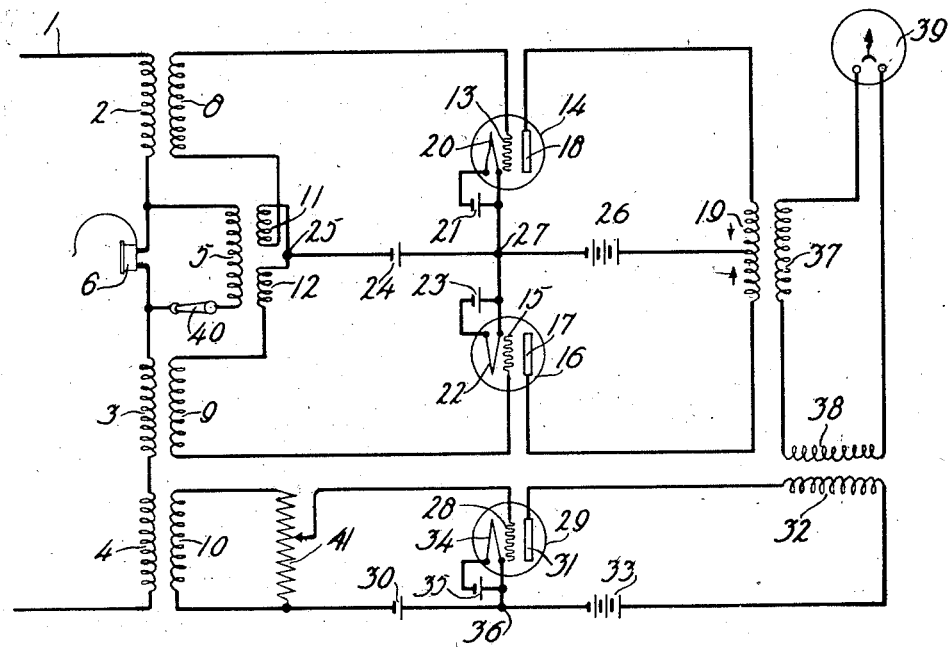
*Inventor:*
John Mills
by [signature], Atty.

Patented Dec. 15, 1925.

1,566,034

UNITED STATES PATENT OFFICE.

JOHN MILLS, OF WYOMING, NEW JERSEY, ASSIGNOR TO WESTERN ELECTRIC COMPANY, INCORPORATED, OF NEW YORK, N. Y., A CORPORATION OF NEW YORK.

THERMIONIC METER.

Application filed September 8, 1920. Serial No. 408,870.

*To all whom it may concern:*

Be it known that I, JOHN MILLS, a citizen of the United States, residing at Wyoming, in the county of Essex and State of New Jersey, have invented certain new and useful Improvements in Thermionic Meters, of which the following is a full, clear, concise, and exact description.

This invention relates to a thermionic meter.

It is the object of the present invention to provide a thermionic metering device whereby the power of an oscillatory current circuit may be continuously recorded.

It has been found that by the use of vacuum tubes in connection with an oscillatory current circuit, a current which is proportional at all times to the product of the instantaneous voltage and current in the oscillatory current circuit may be produced.

The manner in which this current is obtained will hereinafter be described by reference to the drawing, which illustrates the preferred embodiment of the invention.

The drawing shows a thermionic metering device for continuously recording the power supplied by an oscillatory current circuit 1 to a load 6. The load is illustrated by a telephone receiver since a thermionic power measuring device is peculiarly suited to determine the power supplied to apparatus of this type. In the ordinary wattmeter circuit there is a current coil in series with the load and a potential coil in parallel with the load. In the present circuit the potential coil is 5. The current coil is sub-divided into three parts, namely, 2, 3, and 4. These coils may be the primaries of instrument transformers of which the coils 11 and 12, 8, 9 and 10 are respectively the secondaries. A switch 40 is provided in series with the potential coil 5. One end of coil 8 is connected with grid 13 of vacuum tube 14, and the other end is connected to the coil 11. Similarly, one end of coil 9 is connected to the grid 15 of the vacuum tube 16 and the other end is connected to the coil 12. The plate 17 of the vacuum tube 16 and the plate 18 of the vacuum tube 14 are each connected to one end of coil 19. The filament 20 of the vacuum tube 14 adapted to be heated to incandescence by battery 21, and the filament 22 of the vacuum tube 16 adapted to be heated to incandescence by battery 23, are connected together as shown. The negative pole of battery 24 which is the common grid circuit battery for the two vacuum tubes 14 and 16, is connected to the common terminal 25 of coils 11 and 12, while the positive pole is connected to the negative pole of battery 26, which constitutes a common source of energy for the plate circuits of tubes 14 and 16. The common lead of the filaments as above described, is connected with the lead between batteries 24 and 26 at point 27. The positive pole of battery 26 is connected to the midpoint of coil 19. One end of coil 10 which is inductively associated with current coil 4 in the oscillatory current circuit 1, is connected to the grid 28 of the vacuum tube 29 through the adjustable resistance 41, while the other end is connected to the negative pole of battery 30, which is a steady source of potential for the grid circuit of the tube 29. The plate 31 of tube 29 is connected to one end of coil 32, the other end of this coil being connected with the positive pole of a battery 33 which comprises the source of energy for the plate circuit of tube 29. Filament 34 of tube 29, heated by battery 35 is connected at point 36 to the lead connecting the positive pole of battery 30 and the negative pole of battery 33. Coils 37 and 38 which are inductively associated with coils 19 and 32 respectively form a closed circuit with the device 39, the latter consisting of an oscillograph or other recording mechanism. It will be noticed that by virtue of the circuit arrangement as shown, tubes 14 and 16 comprise a balanced pair of vacuum tube amplifiers, while tube 29 is adapted to be adjusted by means of the resistance 41 as desired.

In order that the current value recorded at 39 be a measurement of the power of circuit 1, it is necessary that it be proportional to the product of the current and voltage in that circuit at each and every insant of time. In order to secure this, the current induced in coil 38 must be of such a value that it will entirely eliminate all the current induced in coil 37, which is not proportional to the factors as above stated. This value may be readily ascertained in the following manner. The potential coil 5 is removed from the circuit by opening a switch 40, and then the resistance 41 is so adjusted as to balance all effect at 39. In other words, the current induced in the coil 38 will be equal and opposite in direction to that induced in coil 37. If now, the potential coil 5 is again placed in the circuit by closure of switch 40, and the adjustment of resistance 41 is unchanged, the current recorded at 39 will be a measure of the power in circuit 1.

A more complete understanding of the above may be had by means of the following considerations. Assume that the E. M. F. induced in the current coils 8, 9 and 10, be $E_c$ and that in potential coils 11 and 12 $E_p$ and let the potential of battery 24 be $E_{24}$ and that of battery 26, $E_{26}$. The effective E. M. F. in the grid circuits of tubes 14 and 16 will be designated as $E_1$ and $E_2$ respectively, while the current flowing in the plate circuits of tubes 14 and 16 will be designated as $I_1$ and $I_2$ respectively.

Applying the equation of the three-element tube fully discussed on pages 44 and 45 of Radio Communication Theory and Methods (edition 1917) by John Mills, and substituting therein the terms described hereinabove the currents flowing in the plate circuits have values as follows:

$$I_1 = L(E_{26} + uE_1)^2$$
$$I_2 = L(E_{26} + uE_2)^2$$

Where:—L=the proportional factor.
$u$=the constant depending upon the design of the tube.

It will be clear that $E_1$ and $E_2$ are each composed of three separate factors which may be shown as follows:—

$$E_1 = E_{24} + E_p - E_c$$
$$E_2 = E_{24} + E_p + E_c$$

The net current then which passes thru coil 19, is $$I_2 - I_1 = 2LuE_{26}(E_2 - E_1) + Lu^2(E_2^2 - E_1^2).$$

But,
$$E_2 - E_1 = 2E_c$$
and
$$E_2^2 - E_1^2 = 4E_{24}E_c + 4E_cE_p.$$

Therefore:
$$I_2 - I_1 = (4LuE_{26} + 4Lu^2E_{24})E_c + 4Lu^2E_cE_p.$$

By cutting out the potential coil 5 through operation of switch 40, as hereinbefore described, the last term in the equation above is eliminated since the potential $E_p$ becomes zero and the current value in the coil 19 is—

$$(4LuE_{26} + 4Lu^2E_{24})E_c.$$

This is also a measure of the current in coil 37, which must be eliminated by adjusting the resistance 41 so as to produce a potential across the coil 38 equal and opposite to that across the coil 37. When, therefore, the switch 40 is again closed, the resultant potential in the recording circuit due to the component corresponding to the term, $4Lu^2E_cE_p$ will produce a current therein proportional to the power in circuit 1, since as hereinbefore pointed out, $E_c$ is proportional to the load current and $E_p$ to the load voltage.

When the adjustment of resistance 41 is completed in accordance with the directions herein given, the current flowing in the recording circuit will be $4Lu^2E_cE_p$, which is obviously proportional to the power in circuit 1.

While a specific circuit arrangement has been described hereinabove, by means of which, the power of an oscillatory current circuit, at any instant of time, may be measured, it is considered that the scope of the present invention includes all other similar arrangements wherein vacuum tubes are employed. In referring to vacuum tubs in the description of the invention and the claims, that class of vacuum tubes employing a filament, grid and plate, such as the audion is meant.

What is claimed is:

1. In combination, a circuit comprising a current recording device, a circuit comprising a pair of balanced vacuum tubes inductively associated with said first circuit, an adjustable vacuum tube circuit inductively connected with said first circuit, and an oscillatory current circuit having current and potential coils inductively associated with said two last named circuits.

2. In combination, a pair of balanced vaccum tubes having input and output circuits, an oscillatory current circuit having current coils and a potential coil, a pair of coils in each of said grid circuits, one of each of said pair of coils being inductively associated with a current coil of said oscillatory current circuit and the other of each of said pair of coils being inductively associated with a potential coil of said oscillatory current circuit, a vacuum tube having an adjustable grid circuit inductively associated with a current coil of said oscillatory current circuit and an output circuit, and a third circuit comprising current recording means and having two coils one of which is inductively associated with the output circuit of said balanced vacuum tubes and the other coil inductively associated with the output circuit of said vacuum tube.

3. In combination, an oscillatory circuit having three coils in series, a pair of balanced vacuum tubes having input and output circuits, each of said input circuits being inductively connected with one of said coils, a single vacuum tube having input and output circuits, said input circuit being inductively connected with another of said coils, and a recording circuit inductively connected to each of said output circuits.

4. In combination, an oscillatory current circuit, a balanced vacuum tube circuit having input and output circuits, a single vacuum tube having an adjustable input circuit and an output circuit, inductive connections between said oscillatory current circuit and each of said input circuits, and a recording circuit inductively connected to each of said output circuits.

5. In combination, an oscillatory current circuit, a load in said circuit, a potential coil in parallel with said load, current coils in series therewith, a plurality of vacuum tube circuits inductively associated with said current and potential coils, a recording circuit common to said vacuum tube circuits and means in said recording circuit for indicating the power supplied to said load.

In witness whereof, I hereunto subscribe my name this 31st day of August A. D., 1920.

JOHN MILLS.